United States Patent [19]

Ueda et al.

[11] Patent Number: 5,308,086
[45] Date of Patent: May 3, 1994

[54] VIDEO GAME EXTERNAL MEMORY ARRANGEMENT WITH REDUCED MEMORY REQUIREMENTS

[75] Inventors: Hiroo Ueda, Toyonaka; Hiromitsu Yagi, Itami, both of Japan

[73] Assignees: Ricoh Co., Ltd, Tokyo; Nintendo Co., Ltd., Kyoto, both of Japan

[21] Appl. No.: 901,030

[22] Filed: Jun. 19, 1992

Related U.S. Application Data

[63] Continuation of Ser. No. 534,305, Jun. 7, 1990, Pat. No. 5,125,671, which is a continuation of Ser. No. 343,786, Apr. 26, 1989, abandoned, which is a continuation of Ser. No. 14,150, Feb. 12, 1987, Pat. No. 4,824,106, which is a continuation of Ser. No. 869,383, May 30, 1986, abandoned, which is a continuation of Ser. No. 564,091, Dec. 21, 1983, abandoned.

[30] Foreign Application Priority Data

Dec. 22, 1982 [JP] Japan .................... 57-234487
Dec. 23, 1982 [JP] Japan .................... 57-234473

[51] Int. Cl.$^5$ ............................ A63F 9/24; G09G 1/16
[52] U.S. Cl. .................................... 273/435; 273/434; 273/DIG. 28; 273/437
[58] Field of Search ............... 273/433, 434, 435, 437, 273/85 G, DIG. 28; 434/43; 364/410; 340/705, 721, 723, 724, 725; 358/104, 142, 91, 92, 183

[56] References Cited

U.S. PATENT DOCUMENTS

| | | |
|---|---|---|
| 3,011,164 | 11/1961 | Gerhardt . |
| 3,242,470 | 3/1966 | Hagelbarger et al. . |
| 3,319,248 | 5/1967 | Balding . |
| 3,396,377 | 8/1968 | Strout . |
| 3,403,391 | 9/1968 | McCown . |
| 3,540,012 | 11/1970 | Ehrman . |
| 3,593,310 | 7/1971 | Kievit . |
| 3,594,757 | 7/1971 | Gard . |
| 3,611,348 | 10/1971 | Rogers . |
| 3,631,457 | 12/1971 | Hamada et al. . |
| 3,637,997 | 1/1972 | Petersen . |
| 3,643,258 | 2/1972 | Balding . |
| 3,668,685 | 6/1972 | Horvath . |
| 3,675,208 | 7/1972 | Bard . |
| 3,675,232 | 4/1972 | Strout . |
| 3,680,077 | 7/1972 | Hoberecht . |

(List continued on next page.)

FOREIGN PATENT DOCUMENTS 2000946A 6/1978 United Kingdom .
2104760A 3/1983 United Kingdom .

OTHER PUBLICATIONS

*TMS9918A/9928A/9929A*, Japanese language manual, published by Texas Instruments Inc. (1982).

*TMS9118 TMS9128 TMS9129 Data Manual,* Video Display Processors, Texas Instruments, (59 pages) (1984).

C. L. Lawson, "Scanned-Display Computer Graphics", 14 *Communications of the ACM*, No. 3, Noll, Bell Telephone Labs, Inc., pp. 143–150 (Mar. 1971).

W. M. Newman, "Trends in Graphic Display Design", C25 *Transactions on Computers*, No. 12, Manuscript, 5 pp, (Dec. 1976).

*Microprocessors and Microcomputer Systems,* Excerpt, pp. 178–179, (Mar. 1977).

*Primary Examiner*—Jessica J. Harrison
*Attorney, Agent, or Firm*—Nixon & Vanderhye

[57] ABSTRACT

A T.V. game system for displaying a desired picture on the screen of a raster scanning type T.V. set includes a motion picture pattern generator, a still picture pattern generator, a central processing unit for controlling the overall operation of the system under the control of the operator, and a picture processing unit for combining motion and still picture patterns to form a video signal to be supplied to the T.V. set, whereby the picture processing unit includes a motion picture attribute table memory which stores information relating to motion picture pattern for the next following frame during the horizontal blanking period and a temporary memory which stores information relating to motion picture pattern to be displayed in the next following line by accessing the motion picture attribute table memory during the scanning of current line.

2 Claims, 7 Drawing Sheets

U.S. PATENT DOCUMENTS

| | | |
|---|---|---|
| 3,683,359 | 8/1972 | Kleinschnitz . |
| 3,685,038 | 8/1972 | Flanagan . |
| 3,697,678 | 10/1972 | Belleson . |
| 3,716,842 | 2/1973 | Belady et al. . |
| 3,742,288 | 6/1973 | Albrecht et al. . |
| 3,742,482 | 6/1973 | Albrecht et al. . |
| 3,747,087 | 7/1973 | Harrison, III et al. . |
| 3,750,135 | 7/1973 | Carey et al. . |
| 3,778,810 | 12/1973 | Hayashi . |
| 3,781,850 | 12/1973 | Gicca et al. . |
| 3,786,429 | 1/1974 | Goldman et al. . |
| 3,786,476 | 1/1974 | Graves et al. . |
| 3,793,483 | 2/1974 | Bushnell . |
| 3,801,961 | 4/1974 | Coombe . |
| 3,872,460 | 3/1975 | Fredrickson et al. . |
| 3,891,792 | 6/1975 | Kimura . |
| 3,893,075 | 7/1975 | Orban et al. . |
| 3,903,510 | 9/1975 | Zobel . |
| 3,918,039 | 11/1975 | Clark . |
| 3,944,997 | 3/1976 | Swallow . |
| 3,955,189 | 5/1976 | Thomson . |
| 3,969,391 | 10/1972 | Peronneau . |
| 3,976,982 | 8/1976 | Eiselen . |
| 3,988,728 | 10/1976 | Inoue et al. . |
| 3,999,167 | 12/1976 | Ito et al. . |
| 4,011,556 | 3/1977 | Tochitani et al. . |
| 4,016,362 | 4/1977 | Bristow et al. . |
| 4,026,555 | 5/1977 | Kirschner et al. . |
| 4,034,983 | 7/1977 | Dash et al. . |
| 4,045,789 | 8/1977 | Bristow . |
| 4,053,740 | 10/1977 | Rosenthal . |
| 4,054,919 | 10/1977 | Alcorn . |
| 4,068,225 | 1/1978 | Lee . |
| 4,070,662 | 1/1978 | Narveson . |
| 4,075,620 | 2/1978 | Passavant et al. . |
| 4,081,797 | 3/1978 | Olson . |
| 4,095,791 | 6/1978 | Smith et al. ............... 273/85 G |
| 4,107,664 | 8/1978 | Marino . |
| 4,107,665 | 8/1978 | Mayer et al. ............... 273/DIG. 28 |
| 4,112,422 | 9/1978 | Mayer et al. . |
| 4,116,444 | 9/1978 | Mayer et al. ............... 273/DIG. 28 |
| 4,119,955 | 10/1978 | Nichols, III . |
| 4,124,843 | 11/1978 | Bramson . |
| 4,127,849 | 11/1978 | Okor . |
| 4,129,858 | 12/1978 | Hara . |
| 4,129,859 | 12/1978 | Iwamura et al. . |
| 4,129,883 | 12/1978 | Stubben . |
| 4,139,838 | 2/1979 | Inose et al. ............... 273/DIG. 28 |
| 4,155,095 | 5/1979 | Kirschner . |
| 4,156,237 | 5/1979 | Okada et al. . |
| 4,158,837 | 6/1979 | Zahorsky . |
| 4,160,981 | 7/1979 | Raney, Jr. . |
| 4,165,072 | 8/1979 | Stubben ............... 273/85 G |
| 4,169,262 | 9/1979 | Schwartz et al. . |
| 4,169,272 | 9/1979 | Rains et al. . |
| 4,189,728 | 2/1980 | Stubben . |
| 4,196,430 | 4/1980 | Denko . |
| 4,243,984 | 1/1981 | Ackley et al. ............... 340/703 |
| 4,262,302 | 4/1981 | Sexton ............... 358/10 |
| 4,296,930 | 10/1981 | Fredericksen ............... 273/DIG. 28 |
| 4,320,395 | 3/1982 | Meissen et al. . |
| 4,324,401 | 4/1982 | Stubben et al. ............... 273/85 G |
| 4,342,991 | 8/1982 | Pope et al. . |
| 4,367,466 | 1/1983 | Takeda et al. ............... 340/725 |
| 4,398,189 | 8/1983 | Pasierb, Jr. et al. ............... 273/DIG. 28 |
| 4,420,770 | 12/1983 | Rahman ............... 358/183 |
| 4,445,114 | 4/1984 | Stubben . |
| 4,471,464 | 9/1984 | Mayer et al. ............... 340/725 |
| 4,641,255 | 2/1987 | Hohmann ............... 434/43 |
| 4,824,106 | 4/1989 | Ueda et al. ............... 273/437 |
| 4,858,418 | 4/1986 | Stickel ............... 434/43 |
| 5,125,671 | 6/1992 | Ueda et al. ............... 273/437 |

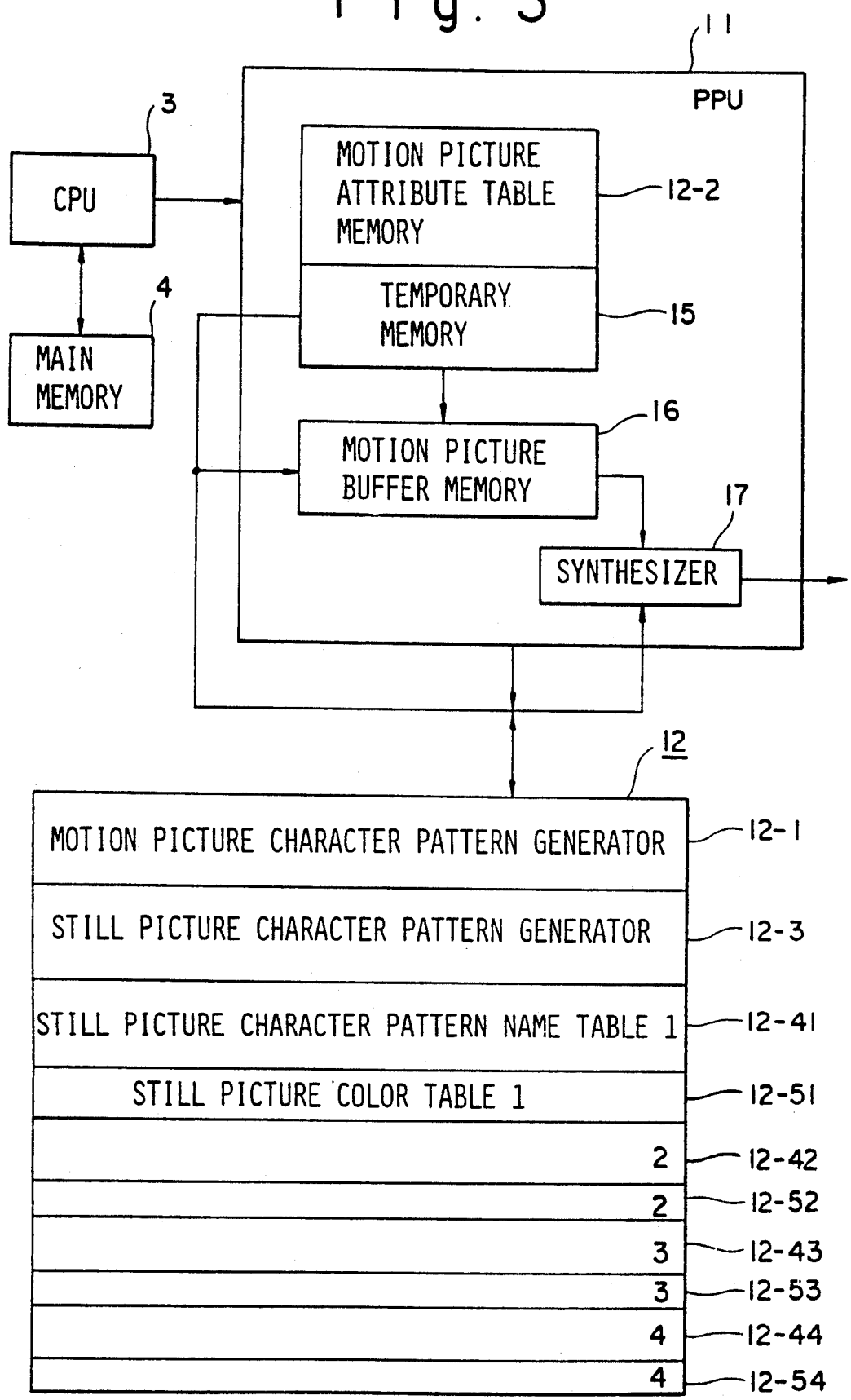

Fig. 4a
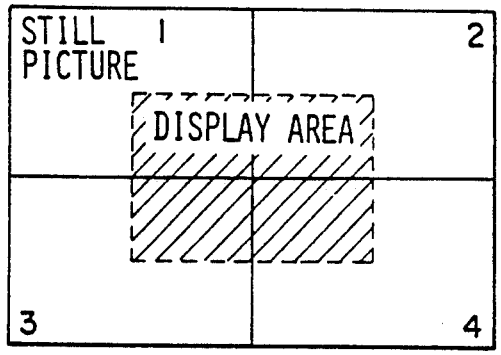
Fig. 4b
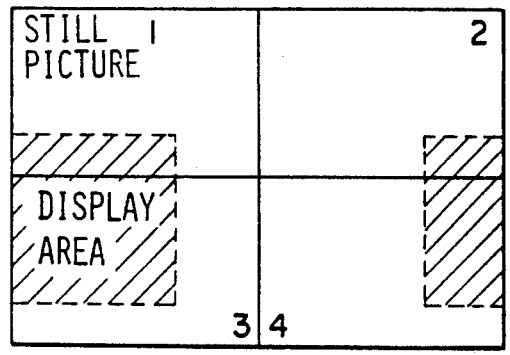
Fig. 6
| VERTICAL POSITION | 0 |
|---|---|
| CHARACTER NO. | 0 |
| ATTRIBUTE | 0 |
| HORIZONTAL POSITION | 0 |
| ⋮ | |
| VERTICAL POSITION | 63 |
| CHARACTER NO. | 63 |
| ATTRIBUTE | 63 |
| HORIZONTAL POSITION | 63 |

VIDEO GAME EXTERNAL MEMORY ARRANGEMENT WITH REDUCED MEMORY REQUIREMENTS

CROSS-REFERENCE TO RELATED APPLICATIONS

This application is a continuing application of application Ser. No. 07/534,305 filed 7 Jun. 1990 which issued on Jun. 30, 1992 as U.S. Pat. No. 5,125,671; which is a continuing application of application Ser. No. 07/343,786 filed 24 Apr. 1989, now abandoned; which is a continuing application of application Ser. No. 07/014,150 filed 12 Feb. 1987 which issued on 25 Apr. 1989 as U.S. Pat. No. 4,824,106; which is a continuing application of application Ser. No. 06/869,383 filed 30 May 1986, now abandoned; which is a continuing application of application Ser. No. 06/564,091 filed 21 Dec. 1983, now abandoned.

BACKGROUND OF THE INVENTION

1. Field of the Invention

This invention generally relates to image processing technology for combining two or more picture patterns into a single picture frame for display on a picture tube such as a T.V. set, and particularly to an image processing system for displaying a picture frame by combining a motion picture pattern, which may be varied under the control of the operator, with a still picture pattern which defines the background of picture frame. More specifically, the present invention relates to a T.V. game system in which motion picture information and still picture information are controlled independently from each other and they are combined into a series of frames which are then displayed on the T.V. screen.

2. Description of the Prior Art

FIG. 1a shows a prior art T.V. game system which includes a picture processing unit (hereinafter, also referred to as "PPU") 1 which comprises a random access memory (hereinafter, also referred to as "RAM") and is connected to a video memory 2 and to a central processing unit (hereinafter, also referred to as "CPU") 3, which, in turn, is connected to a main memory 4. In the system of FIG. 1a, under the control of CPU 3, motion and still picture data are transferred from the main memory 4 to the video memory 2 to be stored therein temporarily, and then the PPU 1 receives appropriate data from the video memory 2 and to supply an output as a video signal to a T.V. set (no shown) for display under the control of the CPU 3. A memory map contained in the video memory 2 is shown in FIG. 1b, and, as shown, the memory map includes a motion picture character pattern generating area 2-1, a motion picture attribute table 2—2 which is rewritten for each frame to be displayed during the vertical blanking period, a still picture character pattern generating area 2-3, a still picture character pattern name table 2-4 and a still picture color table 2-5.

Describing the operation of the above-described system with reference to FIG. 2, during the horizontal blanking period in carrying out scanning along horizontal line sectors, the motion picture attribute table 2—2 is accessed under the control of the operator thereby retrieving the attributes of motion picture pattern to be displayed in the next scanning line. Then, on the basis of the thus retrieved attributes, desired motion picture character pattern data is outputted from the motion character pattern generating area 2-1 during the same horizontal blanking period thereby generating a motion picture pattern. On the other hand, as the line scanning of the display screen proceeds, a pattern name and a color code are read out from the addresses, which corresponds to a display position, of still picture character pattern name table 2-4 and the still picture color table 2-5, respectively. On the basis of the pattern name thus read out, a pattern data is outputted from the still picture character pattern generating area 2-3 so that a still picture pattern is generated in real time. If there occurs a collision between the still picture pattern data and the motion picture pattern data at the same position on the display screen, either one of them is allowed to be displayed in accordance with a predetermined priority.

In the above-described prior art system, since external address and data buses are used to call and obtain still picture character data during the line scanning period and also the number of pins usable for interconnections between components is limited, the retrieving of the motion picture attribute table and the calling of motion picture character pattern data on the basis of the result of such retrieval must all be carried out during the horizontal blanking period. For this reason, the number of motion picture characters which may be displayed during a single line scanning period is rather limited as is the kind of motion picture characters which may be displayed in a single frame. As a result, displayed pictures tend to be dull and they do not change as fast as pleasing to a viewer.

SUMMARY OF THE INVENTION

Therefore, it is a primary object of the present invention to obviate the above-described disadvantages of the prior art and to provide an improved image processing system.

Another object of the present invention is to provide an image processing system which is suitable for application as a T.V. game system.

A further object of the present invention is to provide an image processing system capable of displaying the increased number and kinds of moving characters without increasing the number of pins when constructed in the form of ICs.

A still further object of the present invention is to provide an improved color encoder particularly suited for use in a T.V. game system.

A still further object of the present invention is to provide an improved T.V. game system.

Other objects, advantages and novel features of the present invention will become apparent from the following detailed description of the invention when considered in conjunction with the accompanying drawings.

BRIEF DESCRIPTION OF THE DRAWINGS

FIG. 1b is a schematic illustration showing the structure of the memory map employed in the video memory 2 shown in FIG. 1a;

FIG. 3 is a block diagram showing the T.V. game system constructed in accordance with one embodiment of the present invention;

FIGS. 4a and 4b are schematic illustrations showing examples of displaying the background on the T.V. screen;

FIG. 6 is a schematic illustration showing the memory map of the motion picture attribute table memory 12-2 shown in FIG. 5;

DESCRIPTION OF THE PREFERRED EMBODIMENTS

Figure 1A:
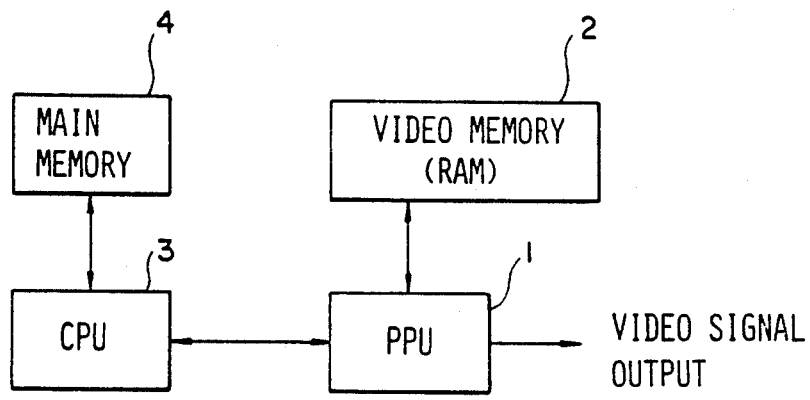
FIG. 1a is a block diagram showing a prior art T.V. game system.
Figure 1B:
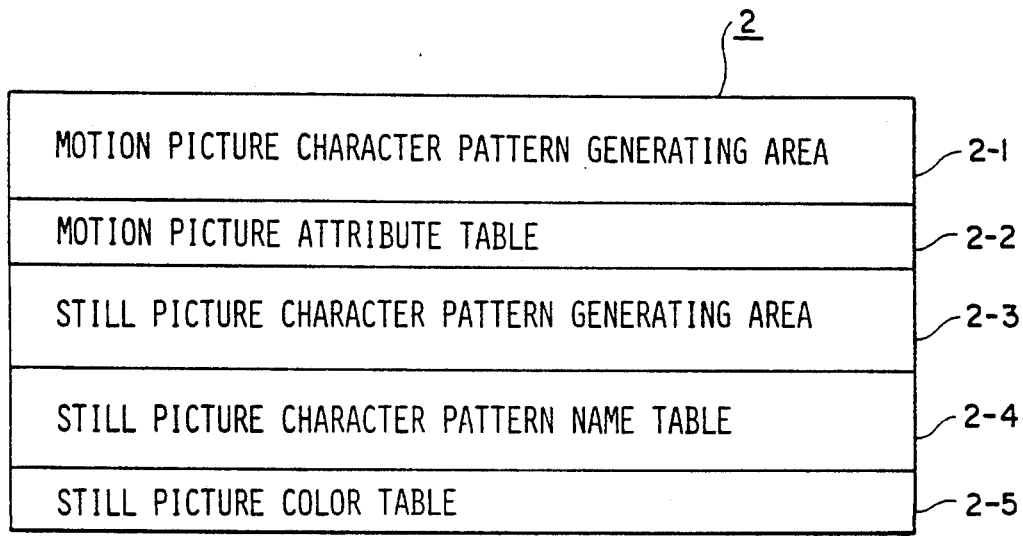
Figure 2:
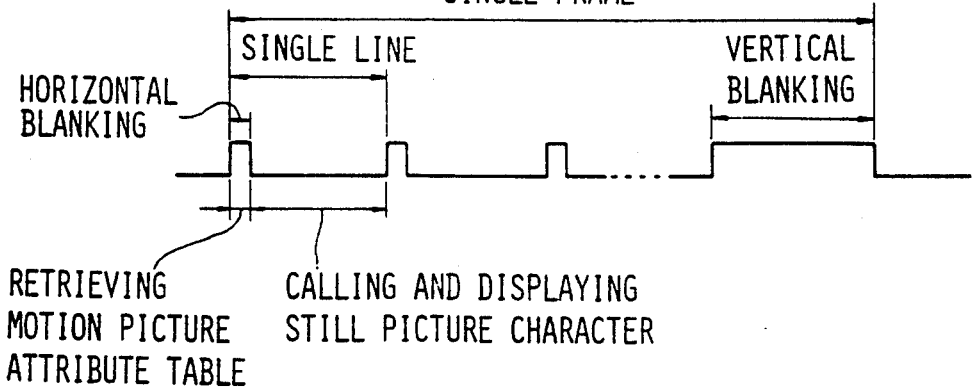
FIG. 2 is a timing chart which is useful for explaining the operation of the system shown in FIGS. 1a and 1b.

FIG. 3 is a block diagram showing the image processing system constructed when applied as a T.V. game system in accordance with one embodiment of the present invention. As shown, the present image processing system or T.V. game system includes a picture processing unit ("PPU") 11 provided with a motion picture attribute table memory 12-2 which is typically comprised of a RAM and which is rewritten for each frame with the information supplied from the video memory, as different from PPU 1 of the prior art system shown in FIG. 1a. PPU 11 also includes a temporary memory 15 which is also typically comprised of a RAM. The temporary memory 15 stores the motion picture character data for a single scanning line by retrieving the motion picture attribute table memory 12-2 and it is rewritten for each scanning line. Also provided in PPU 11 is a motion picture buffer memory 16 which is typically comprised of a RAM whose contents are rewritten for each scanning line and which stores the attributes and pattern data of the motion picture character stored in the temporary memory 15. PPU 11 further includes a synthesizer 17 which is connected to receive an output signal from the motion picture buffer memory 16 and an output signal from a still picture character pattern generator 12-3 or an output signal supplied from an external circuit, as the case may be, to supply a particular signal, which is a combination of two or more input signals, as its output in accordance with predetermined conditions.

A video memory 12 is provided external to PPU 11 and it includes a motion picture character pattern generator 12-1, a still picture character pattern generator 12-3 typically comprised of a ROM or RAM, four still picture character pattern name tables 12-41 through 12-44 typically comprised of RAMs and four still picture color tables 12-51 through 12-54 typically comprised of RAMs. As shown in FIG. 3, PPU 11 is also connected to CPU 3 which controls the overall operation of the present system and which is connected to a main memory 4.

In operation, when a main switch (not shown) is turned on or programs containing different games are changed, the contents of the still picture character pattern name tables 12-41 through 12-44 and still picture color tables 12-51 through 12-54 are rewritten in accordance with the main memory 4 under the control of CPU 3. Then, at the first vertical blanking period of a single frame, the contents of the motion picture attribute table memory 12-2 are also rewritten in accordance with the main memory 4 under the control of CPU 3.

In PPU 11, during line scanning, the motion picture character pattern to be displayed in the next scanning line is retrieved from the motion picture attribute table memory 12-2 and stored into the temporary memory 15, and, then, during the horizontal blanking period, the motion picture character pattern generator 12-1 is retrieved on the basis of the data then stored in the temporary memory 15 via address and data buses, thereby causing the data necessary to display a motion picture character for the next line to be stored into the motion picture buffer memory 16. After initiation of line scanning, when the corresponding horizontal position has been reached, the motion picture character pattern data is supplied to the synthesizer 17 from the motion picture buffer memory 16, and at the same time the still picture character pattern name tables 12-41 through 12-44 and the color tables 12-51 through 12-54 are retrieved in real time via address and data buses so that the still picture character pattern data thus retrieved and defining the background of a displayed picture is supplied from the still picture character pattern generator 12-3 to the synthesizer 17.

In the embodiment illustrated in FIG. 3, the still picture character pattern name tables 12-41 through 12-44 and the still picture color tables 12-51 through 12-54 are larger in area by four times than the display area or screen. Accordingly, a desired still picture may be displayed on the display screen by using only one of the four still picture character pattern name tables, or, alternatively, the display area may be set at any location within the scope of four frames to define a desired background to be displayed on the screen as shown in FIGS. 4a and 4b. The display area may be shifted horizontally as well as vertically independently from each other in a scrolling fashion with a dot as a unit. Such a scrolling technique is disclosed, for example, in the Japanese Patent Laid-open Pub. No. 55-96186.

It is to be noted that in the video memory 12 the motion picture character pattern generator 12-1 and the still picture character pattern generator 12-3 may not only be used separately from each other as described above but also be used in common. That is, the same character pattern generator may be accessed by an address for motion picture and another address for still picture thereby producing both of motion picture and still picture characters from the same character pattern generator. Such a structure is advantageous because an increased number of characters may be generated using a character pattern generator of the same capacity as compared with the case in which a character pattern generator is not used in common.

An assumption is made here that the display area or screen has the width of 256 dots in the horizontal direction and the height of 240 dots in the vertical direction and a character constituting a motion picture or still picture is defined by a matrix of 8 dots by 8 dots. It is also assumed that the max. number of motion pictures to be displayed on a single horizontal line is eight and thus 64 motion pictures may be displayed on the screen at maximum at the same time. Furthermore, in the motion picture character pattern generator 12-1 and the still picture character pattern generator 12-3, a single dot or picture element to be displayed on the screen is represented by two bits and thus a single character formed by 8 dots by 8 dots is represented by 16 bytes.

Figure 5:
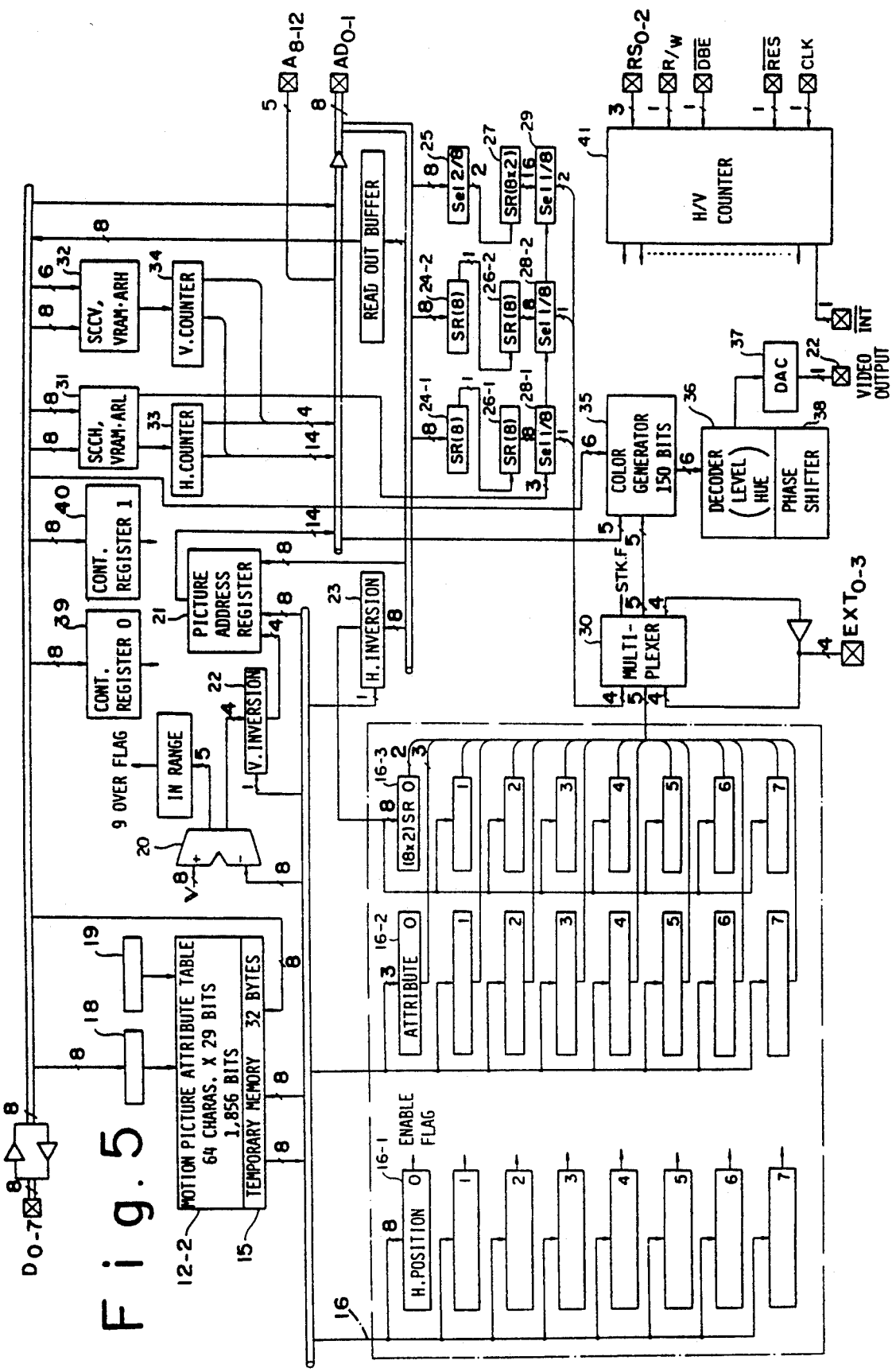
FIG. 5 is a block diagram showing the detailed structure of the system shown in FIG. 3.

FIG. 5 shows the detailed structure of PPU 11 shown in FIG. 3. Now, it will first be described as to the structure for displaying a motion picture character pattern.

The motion picture attribute table memory 12-2 for storing the attributes of motion picture characters for a single frame has a capacity to store sixty-four motion picture characters as shown in FIG. 6 and it has areas for storing a vertical position (8 bits), a character number (8 bits), an attribute (5 bits) and a horizontal position (8 bits) for each character to be displayed. The attribute data includes 1 bit for each of horizontal and vertical inversions, 1 bit for determining the priority between motion and still picture characters and 2 bits for color display.

Storage of data from CPU 3 into the motion picture attribute table 12-2 is carried out via input terminals $D_{0-7}$ and its storage position is determined by a motion picture attribute memory address register 18. While the previous line is being scanned, the retrieval of the motion picture character to be displayed on the next following line is carried out by a comparator 20 using a vertical position data. At the comparator 20, the signal indicating the vertical position of the next line to be displayed is compared with the vertical position data of each character stored in the motion picture attribute table memory 12-2 to determine whether they agree (in-range) or not. The motion picture character which has been found to be in-range is then stored into the temporary memory 15 by means of a temporary memory register 19. The temporary memory 15 is provided with an area capable of storing eight motion picture characters at the same time. Accordingly, if nine or more motion picture characters have been found to be in-range, only eight of them are stored into the temporary memory 15 with a flag indicating the presence of nine or more being posted.

The motion picture buffer memory 16 whose contents are rewritten during the horizontal blanking period also has the memory area capable of storing eight motion picture characters to be displayed on the next line, and, in the buffer memory 16, for each motion picture character, a horizontal position area (8 bits) 16-1, an attribute area (3 bits) 16-2 and a pair of shift registers (8 bits) 16-3 are allocated. The horizontal position area 16-1 stores a horizontal position data supplied from the temporary memory 15, and this area is structured in the form of a down-counter which down-counts in accordance with the scanning along a horizontal scanning line, and when the count has reached "0", the motion picture character is supplied as its output. The attribute area 16-2 stores a bit for determining the priority and two bits of color data and thus three bits in total among the attribute data stored in the temporary memory 15. Each of the shift registers 16-3 stores 8-bit data supplied as an output from the motion picture character pattern generator 12-1 in accordance with the character number of motion picture character in the temporary memory 15. The reason why a pair of shift registers 16-3 are provided in parallel is that a picture element is represented by two bits.

In FIG. 5 is also provided a picture address register 21 which retrieves the character pattern generator 12-1 or 12-3 from terminals $AD_{0-7}$ through buses by means of motion picture character data, which has been found to be in-range, during the horizontal blanking period and of still picture character data during the line scanning period and calls or obtains corresponding character pattern data. In case where a vertical inversion data is contained in the motion picture character data, the retrieving operation is carried out with the vertical address inverted within the motion picture character pattern in accordance with a signal supplied from an inverter 22. There is also provided a horizontal inverter 23 which functions to supply the retrieved motion picture character pattern data with the order of transmission reversed to the shift register 16-3 of motion picture buffer memory 16 if a horizontal inversion signal is contained in the motion picture character data.

Next, a description will be made as to the structure for displaying a still picture (background) character pattern. As line scanning proceeds, still picture character pattern data of the corresponding position is supplied through the terminals $AD_{0-7}$ in accordance with a signal from the picture address register 21. This character pattern data is comprised of a two bit data for character pattern and another two bit data for color display for a single dot on the display screen, so that the character pattern data and color display data are inputted to the shift registers 24-1, 24-2 and a selector 25, respectively, which are then inputted to selectors 28-1, 28-2 and 29 in the form of 8, 8 and 16 bits through shift registers 26-1, 26-2 and 27, respectively. In the case where no scrolling operation is to take place, these data are then outputted to a multiplexer 30 in the order mentioned without change.

The structure of FIG. 5 also includes a register 31 which has a dual function as a horizontal scroll register (SCCH) and as a video memory address register (VRAM.ARL) for counting the lower address of video memory and another register 32 having a dual function as a vertical scroll register (SCCV) and as a video memory address register (VRAM.ARH) for counting the upper address of video memory. In the scroll registers 31 and 32 are set offset values (scrolling initiation position) at the time of scrolling in the order of that in the horizontal direction and that in the vertical direction, and the selection of selectors 28-1, 28-2 and 29 is carried out in accordance with these offset values. On the other hand, when used as video memory address registers 31 and 32, upon completion of read out/write in operation of video memory 12, values of 1 and 32 are respectively added automatically. Also provided as connected to the registers 31 and 32 are horizontal and vertical counters 33 and 34, respectively.

The multiplexer 30 constitutes part of the synthesizer 17 shown in FIG. 3 and it receives motion picture character pattern data and still picture character pattern data and moreover another motion picture character pattern data and still picture character pattern data from terminals $EXT_{0-3}$, as the case may be. The multiplexer 30 then supplies its output signal to a color generator 35 in accordance with the priority order determined by the attribute data within the motion picture character pattern data. If desired, the multiplexer 30 may so function to supply its output signal to the exterior through the terminals $EXT_{0-3}$. In the case where a collision occurs between a particular motion picture character pattern data and a still picture character pattern data in the multiplexer 30, a flag (STK.F) for that effect is raised.

The color generator 35 is typically comprised of a RAM and it is accessed by a 6-bit code comprised of a 2-bit code designating one of four levels and a 4-bit code designating one of 12 kinds of phases (hue), so that selection is made by a 4-bit data representing a character pattern data supplied as an output from the multiplexer 30. A decoder 36 is provided as connected to receive an output signal from the color generator 35 as its input thereby converting it into a level selection signal and a phase selection signal. Also provided as connected to receive an output signal from the decoder as its input is a digital-to-analog converter (DAC) 37 which serves to have its input converted into and supplies as its output an analog video signal. A phase shifter 38 is provided as connected to the decoder 36.

It is to be understood that the synthesizer 17 of FIG. 3 is constructed by those elements of multiplexer 30, color generator 35, decoder 36, DAC 37 and phase shifter 38. Also provided are control registers 39 and 40 for determining the operating mode of PPU 11 and they receive data from CPU 3 via a counter 41.

Figure 7:
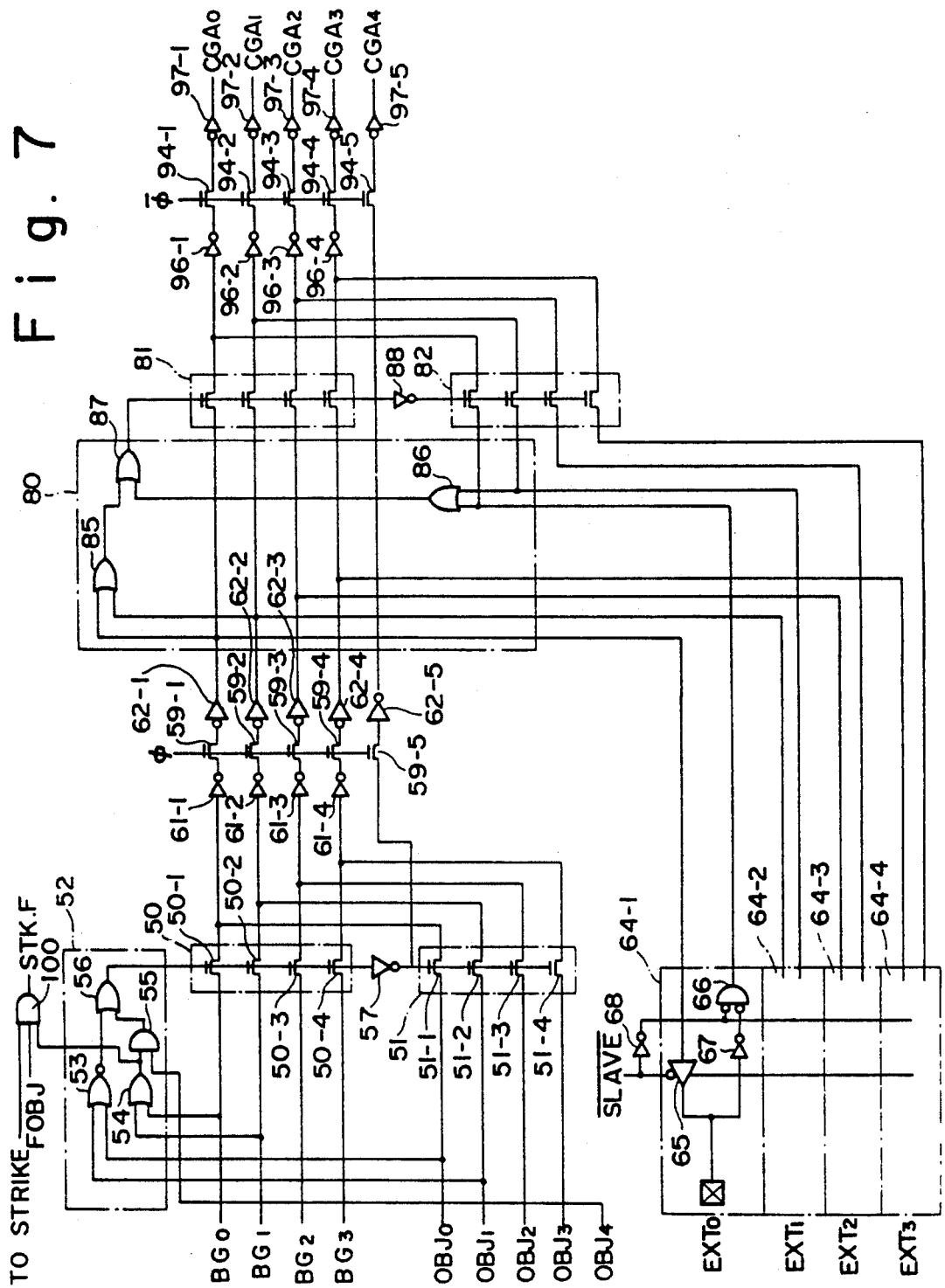
FIG. 7 is a circuit diagram partly in logic symbols showing the detailed structure of the multiplexer 30 shown in FIG. 5.

FIG. 7 shows in detail the structure of multiplexer 30. As shown, the multiplexer 30 includes a transmission gate 50 for transmitting a 4-bit still picture character pattern data (BG0-BG3) and it includes four MOS transistors 50-1 through 50-4 each corresponding to each bit. Also provided is another transmission gate 51 for transmitting a 4-bit portion (OBJ0-OBJ3) among a 5-bit motion picture character pattern and it is provided with four MOS transistors 51-1 through 51-4 one for each bit. Provided in the multiplexer 30 is a priority determining circuit 52 for determining to transmit either one of the still picture character pattern data BG0-BG3 forming a background of displayed picture and the motion picture character pattern data OBJ0-OBJ3 and it is so structured that a NOR circuit 53 receives OBJ0 and OBJ1 as its two inputs and an OR circuit 54 receives BG0 and BG1 as its two inputs. Data OBJ4 which determines the priority order and an output from the OR circuit 54 are supplied as two inputs to an AND circuit 55 whose output is supplied as one input to another OR circuit 56 which also receives as its the other input an output from the NOR circuit 53. The OR circuit 56 is connected to supply its output to the gate of each of the MOS transistors 50-1 through 50-4 and to supply its inverted output to the gates of MOS transistors 51-1 through 51-4 via an inverter 57.

As a result, depending upon a combination of BG0, BG1, OBJ0, OBJ1 and OBJ4, either one of the transmission gates 50 and 51 is turned on, so that BG0-BG3 or OBJ0-OBJ3 and the output signal from the inverter 57 indicating the result of the priority order determination are transferred through inverters 61-1 through 61-4 and 62-1 through 62-5 via transmission gate transistors 59-1 through 59-5, which are turned on and off in accordance with a clock signal $\phi$.

Turn-over circuits 64-1 through 64-4 are also provided and they are appropriately activated by a slave signal $\overline{\text{SLAVE}}$ to thereby cause the terminals EXT0--EXT3 to function either as input or output terminals when two PPUs are connected to each other. The turn-over circuit 64-1 includes a driver circuit 65 which receives as its input either of data BG0 or OBJ0 and which also receives the $\overline{\text{SLAVE}}$ signal for controlling the passage of data therethrough. Moreover, in order to control data input via the terminal EXT0, the turn-over circuit 64-1 includes a NAND circuit 66 which has one input connected to receive the data supplied via the terminal EXT0 through an inverter 67 and the remaining input connected to receive the $\overline{\text{SLAVE}}$ signal via another inverter 68. The other turn-over circuits 64-2 through 64-4 are similarly structured.

Also provided is a master/slave priority order determining circuit 80 which causes a transmission gate 81 or 82 to be turned on in accordance with the $\overline{\text{SLAVE}}$ signal and input signals from BG0, BG1 (or OBJ0, OBJ1) and EXT0, EXT1 terminals, thereby determining to transfer the data from either one of the master and slave PPUs. BG0 and BG1 (or OBJ0 and OBJ1) are supplied as inputs to an OR circuit 85 and the data supplied through the EXT0 and EXT1 terminals are inputted to a NOR circuit 86. The circuit 80 includes another OR circuit 87 which has its one input connected to receive an output signal from the OR circuit 85 and the remaining input connected to receive an output signal from the NOR circuit 86 and the OR circuit 87 is connected to supply its output signal to the gate of each of MOS transistors provided in a transmission gate 81 and to supply its inverted output signal to the gate of each of MOS transistors in another transmission gate 82 via an inverter 88.

The data transferred through the transmission gate 81 or 82 then passes through inverters 96-1 through 96-4 and transmission gate MOS transistors 94-1 through 94-4 which are controlled by a clock signal $\phi$ and inverters 97-1 through 97-4 to be supplied as address signals CGA0-CGA3 for addressing the color generator 35 shown in FIG. 5. As a signal CGA4 which indicates whether CGA0-CGA3 are either BG0-BG3 or OBJ0-OBJ3, an output signal supplied from the priority determining circuit 52 is used after having been inverted by an inverter 94-5.

There is also provided an AND circuit 100 which functions to raise a collision flag (STK.F) when a collision has occurred between BG0-BG3 and OBJ0-OBJ3.

The operation of priority order determining circuit 52 of the multiplexer 30 shown in FIG. 7 may be summarized in the following table.

| OBJ0 + OBJ1 | BG0 + BG1 | OBJ4 | Data transferred thru gate 50 or 51 |
|---|---|---|---|
| 0 | 0 | 0 | BG |
| 0 | 1 | 0 | BG |
| 1 | 0 | 0 | OBJ |
| 1 | 1 | 0 | OBJ |
| 0 | 0 | 1 | BG |
| 0 | 1 | 1 | BG |
| 1 | 0 | 1 | OBJ |
| 1 | 1 | 1 | BG |

Next, in the case where two PPUs are provided as connected to each other and the present PPU serves as a master, the $\overline{\text{SLAVE}}$ signal is "1". In the turn-over circuits 64-1 through 64-4, the NAND circuit 66 receives at its one input "0" through the inverter 68, so that the NAND circuit 66 is enabled thereby allowing data to be inputted through the terminals EXT0-EXT3. On the other hand, the driver circuit 65 is disabled since the $\overline{\text{SLAVE}}$ signal is "1", thereby inhibiting data to be outputted. Conversely, in the case where the present PPU serves as a slave, the $\overline{\text{SLAVE}}$ signal is "0" so that the NAND circuit 66 becomes disabled and the driver circuit 65 becomes enabled, thereby setting up the condition in which data may be outputted through terminals EXT0-EXT3. may be outputted Now, the operation of the master/slave priority order determining circuit 80 may be summarized as in the following table.

| BG0 + BG1 (OBJ0 + OBJ1) | EXT0 + EXT1 | $\overline{\text{SLAVE}}$ | Data transferred thru gate 81 or 82 |
|---|---|---|---|
| 0 | | 0 | internal data |
| 0 | | 0 | internal data |
| 1 | | 0 | internal data |
| 1 | | 0 | internal data |
| 0 | 0 | 1 | internal data |

-continued

| BG0 + BG1 (OBJ0 + OBJ1) | EXT0 + EXT1 | $\overline{SLAVE}$ | Data transferred thru gate 81 or 82 |
|---|---|---|---|
| 0 | 1 | 1 | EXT data |
| 1 | 0 | 1 | internal data |
| 1 | 1 | 1 | internal data |

Now, the color generator 35, decoder 36, DAC 37 and phase shifter 38 will be described in detail with particular reference to FIG. 8.

The color generator 35 is comprised of a RAM and capable of storing thirty-two 6-bit color codes, one of which is supplied as its output after having been selected by a 5-bit address signal CGA0-CGA4 supplied from the multiplexer 30. The color code signals stored in the color generator 35 may be rewritten under the control of a CPU 112.

Figure 8:
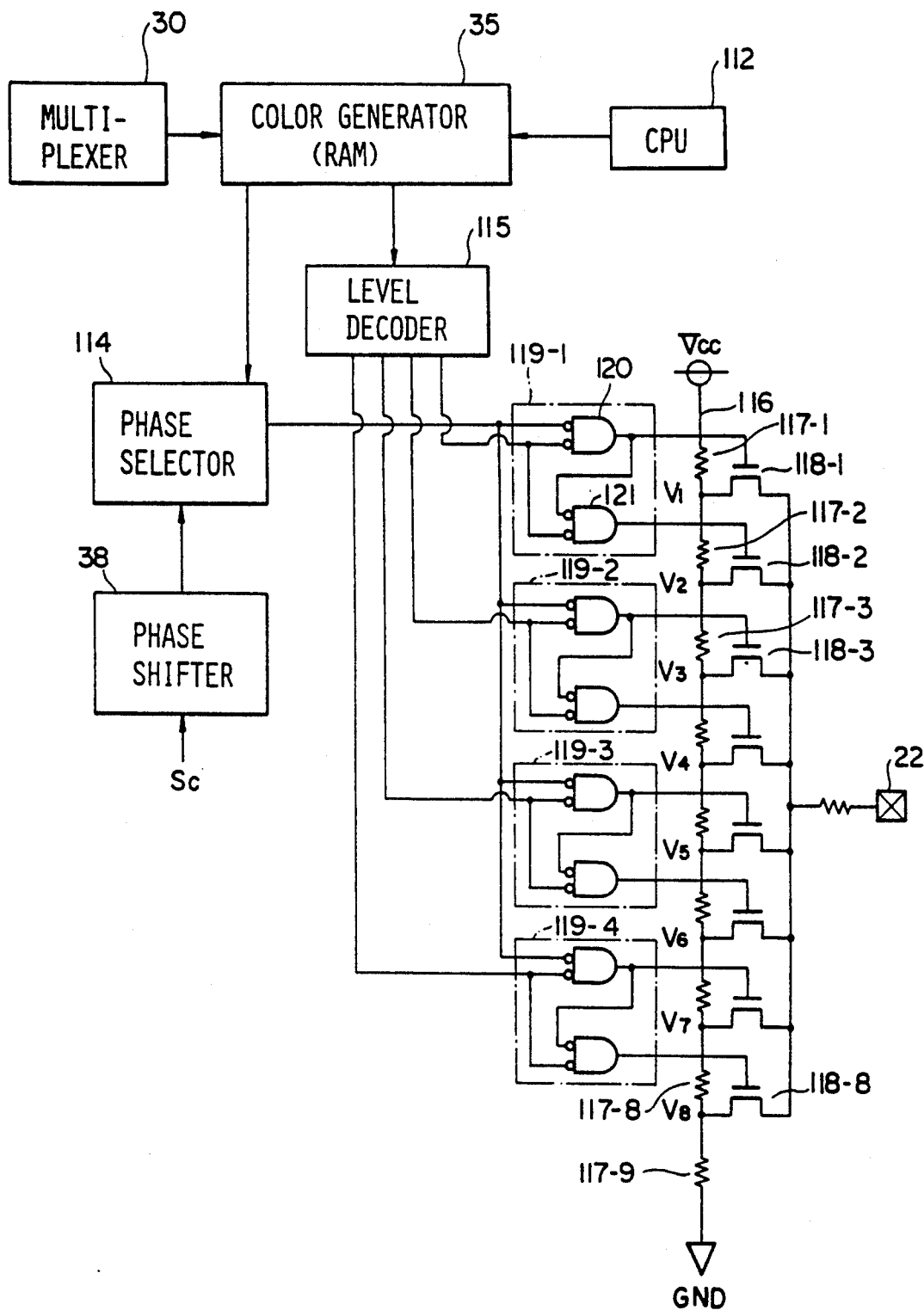
FIG. 8 is a block diagram showing the detailed structure of the color generator 35 shown in FIG. 5.

Provided in the structure of FIG. 8 is a phase shifter 38 which divides six times (3.58 MHz×6) of the frequency of chrominance subcarrier (Sc) and produces twelve kinds of chrominance subcarriers different in phase from each other. Provided as connected to receive an output signal from the phase shifter 38 is a phase selector 114 which receives a 4-bit data among a 6-bit color code signal supplied from the color code generator 35 thereby selectively outputting one of the twelve kinds of chrominance subcarriers different in phase supplied from the phase shifter 38. There is also provided a level decoder 115 which receives a 2-bit data among a 6-bit color code signal supplied from the color generator 35 and converts it into a level selection signal having four different levels. It is to be noted that the decoder 38 of FIG. 5 includes the phase shifter 114 and the level decoder 115.

Also provided as shown in FIG. 8 is a resistor ladder 116 which includes nine resistors 117-1 through 117-9 connected in series between a supply voltage $V_{CC}$ and ground (GND). From each of the nodes between the adjacent resistors, an output signal having a voltage level divided proportionately may be obtained through the corresponding one of MOS transistors 118-1 through 118-8 which together form a transmission gate. Gate circuits 119-1 and 119-4 are provided as appropriately connected to control two of the transistors 118-1 through 118-8 at the same time. Each of the gate circuits 119-1 through 119-4 includes two NAND circuits 120 and 121, each of which has its one input connected to receive the same level selection signal supplied from the level decoder 115. Furthermore, in each of the gate circuits 119-1 through 119-4, one 120 of the pair of NAND circuits has the other input commonly connected to receive the same chrominance subcarrier signal having a desired phase supplied from the phase selector 114; whereas, the other NAND circuit 121 has its other input connected to receive an output signal of the one NAND circuit 120. Each of the NAND circuits 120 and 121 has its output connected to the gate of corresponding one of MOS transistors 118-1 through 118-8. It is to be noted that the DAC 37 of FIG. 5 includes the resistor ladder 116, transistors 118-1 through 118-8 and gate circuits 119-1 through 119-4.

The operation of the structure shown in FIG. 8 will now be described with particular reference to FIG. 9. When a single data is outputted from the multiplexer 30, there is outputted a single color code signal (6 bits) from the color generator 35. The phase selector 114 then receives only four bits among the thus supplied color code signal thereby selecting one out of twelve kinds of chrominance subcarriers different in phase one from another to be supplied to all of the gate circuits 119-1 through 119-4. On the other hand, the level decoder 115 receives a 2-bit data from the same color code signal to supply a level selection signal to one of the gate circuits 119-1 through 119-4.

Now, suppose that, for example, the gate circuit 119-1 is selected by the level decoder 115, then a low level signal is applied to one input of each of the NAND circuits 120 and 121 in the gate circuit 119-1 and a high level signal is applied to one input of each of the NAND circuits 120 and 121 in each of the remaining gate circuits 119-2 through 119-4. Under the condition, if the chrominance subcarrier signal from the phase selector 114 is a low level signal, in the gate circuit 119-1, the NAND circuit 120 supplies a high level output signal and the NAND circuit 121 supplies a low level output signal, so that the transistor 118-1 connected to the node of the resistor ladder at voltage $V_1$ is turned on and the transistor 118-2 connected to the node at voltage $V_2$ is turned off. On the other hand, if the chrominance subcarrier signal is a high level signal, then the NAND circuits 120 and 121 of gate circuit 119-1 supply low and high level signals, respectively, and, thus, the transistor 118-1 connected to the node at voltage $V_1$ is turned off and the transistor 118-2 connected to the node at voltage $V_2$ is turned on. Under the circumstances, the outputs from all of the other gate circuits 119-2 through 119-4 are at low level, and, thus, the transistors 118-3 and 118-8 are all maintained off.

Figure 9:
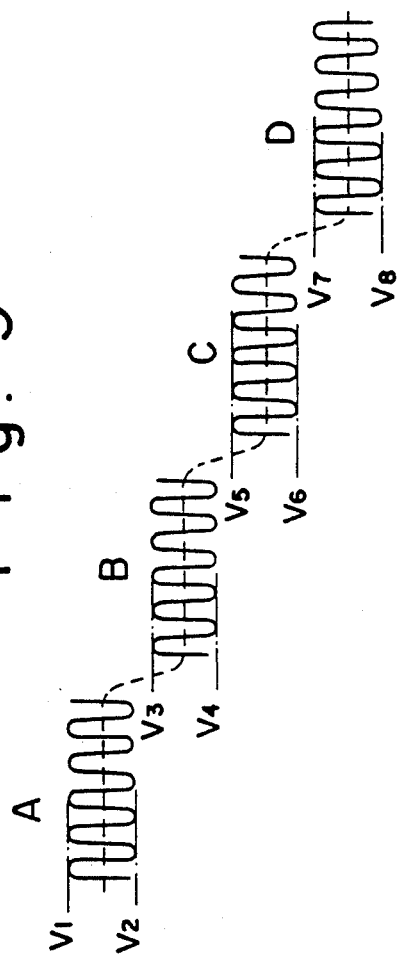
FIG. 9 is a schematic illustration showing color signals at different levels which may be produced as outputs from the structure of FIG. 8.

As a result, an output signal obtained from the output terminal 22 under the condition is a color signal which is defined by a chrominance subcarrier having an intended phase and an amplitude which varies between two voltage levels $V_1$ and $V_2$ in an oscillatory manner, as indicated by a signal A in FIG. 9, whereby the center of amplitude indicates luminance or degree of brightness. In this color signal, the amplitude indicates chroma and the phase indicates hue.

When another level is selected by the decoder 115 in accordance with another output signal from the multiplexer 30, for example when the gate 119-2 is selected, there is outputted a color signal having an amplitude which varies between two voltage levels $V_3$ and $V_4$ as shown by a signal B in FIG. 9. Similarly, color signals for other color code levels are shown by signals C and D in FIG. 9.

If another chrominance subcarrier having a different phase has been selected in accordance with a 4-bit code for phase selection in the color code signal supplied from the color generator 35, another color signal having a different phase (hue) with one of the signals A through D in FIG. 9 having particular amplitudes (chroma) and voltage levels (luminance) is outputted. A color signal thus supplied as an output is then added with a burst signal and a sync signal to be formed into a color video signal which may be supplied to any of conventional T.V. sets (not shown) for display on the screen.

Since each of the twelve different kinds of chrominance subcarriers can take four different levels (amplitudes and voltage levels) in the present embodiment, color may be produced in 48 different representations. However, since the output signal from the multiplexer 30 has a 5-bit structure, color may be produced in 32 different representations at a time. In view of this, provision is made of the color generator 11 capable of storing thirty-two 6-bit color codes in the present embodiment so that although only thirty-two kinds may be selected by the color data generator 10, color may be represented in forty-eight different ways at maximum with a 6-bit color code signal by rewriting the contents of the color generator 35 by CPU 112. Thus, the maximum number of different color representations in the present embodiment is 48, and four of the remaining codes may be allocated to white, gray (2) and black.

Figure 10:
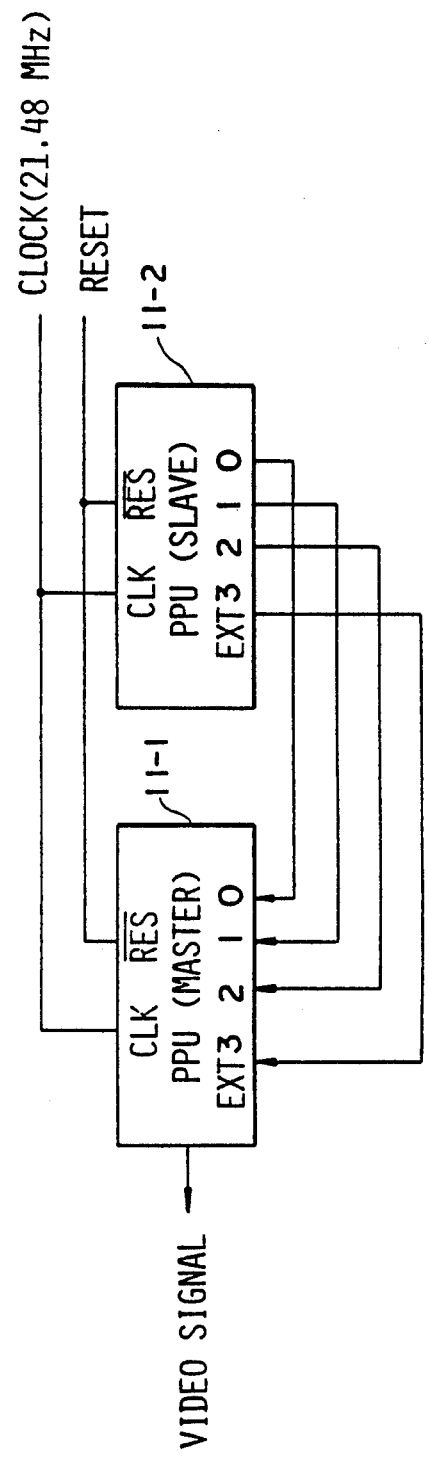
FIG. 10 is a block diagram showing another embodiment in which two picture processing units (PPU) are provided as connected to each other.

FIG. 10 shows another embodiment of the present invention in which two PPUs 11-1 and 11-2 are coupled together to synthesize the character patterns in these PPUs 11-1 and 11-2. Let us assume that use is made of the $\overline{\text{SLAVE}}$ signal and PPUs 11-1 and 11-2 function as a master and a slave, respectively. With PPUs 11-1 and 11-2 interconnected as shown in FIG. 10, a square wave having sharp rising and falling edges is applied to a clock terminal CLK and a reset signal is employed for initial synchronization between the two PPUs 11-1 and 11-2. Under the condition, the character pattern data of slave PPU 11-2 is outputted from terminals EXT0-3 to be inputted to the terminals EXT0-3 of master PPU 11-1, whereby synthesization of character pattern data takes place within the master PPU 11-1 with the determination of priority order as described with reference to FIG. 7.

With the structure shown in FIG. 10, as a video output signal, any of possible combinations between still or motion picture character pattern in master PPU 11-1 and still or motion picture character pattern in slave PPU 11-2 may be obtained and displayed on the screen.

As described in detail above, in accordance with the present invention, provision is made of a motion picture attribute table memory capable of storing information relating to a motion picture pattern for the next following frame during the vertical blanking period and a temporary memory for storing motion picture information to be displayed in the next following line, and, therefore, since the retrieval of motion picture attribute table memory can be done during the preceding line scanning operation, it is only necessary to retrieve the character pattern generator for those motion picture characters thus retrieved and found to be in-range during the horizontal blanking period. As a result, without requiring an increase in the number of connection pins, the number and kinds of motion picture character patterns which may be called or accessed during the horizontal blanking period can be increased.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An external video game memory arrangement for coupling to a video game system having: (a) a picture processing unit including an attribute table memory, a temporary memory coupled to said attribute table memory, a buffer memory coupled to said temporary memory, and background signal generation circuitry; (b) a video signal synthesizer means coupled to said picture processing unit for outputting composite video signals defining video frames for display by a television set, said video signals including line scanning periods, horizontal blanking periods, and vertical blanking periods, and (c) a programmable processor coupled to and cooperating with said picture processing unit, said external memory arrangement comprising:

an external character generator coupled to said picture processor unit, said character generator for providing first character data for storage into said buffer memory during horizontal blanking periods in response to character identification data stored in said temporary memory, and providing further character data to said background signal generation circuitry during line scanning periods, and a program memory for coupling to said programmable processor, said program memory providing at least program control instructions for execution by said programmable processor so as to effect writing of data specifying character identification and position into said attribute table memory during a vertical blanking period associated with a video frame, said character position data being selectively written from said attribute memory into said temporary memory during line scanning and subsequently written from said temporary memory into said buffer memory during horizontal blanking for use in generating composite video signals during a next subsequent video line scanning period.

2. An external video game memory arrangement as in claim 6 wherein said character generator produces motion picture pattern data during horizontal blanking periods and produces still picture pattern data during line scanning periods.

* * * * *